(12) United States Patent
Thomas et al.

(10) Patent No.: US 7,389,686 B2
(45) Date of Patent: Jun. 24, 2008

(54) METHODS AND SYSTEMS FOR DETERMINING AIR DATA PARAMETERS

(75) Inventors: Steven H. Thomas, Brooklyn Center, MN (US); Michael R. Elgersma, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 129 days.

(21) Appl. No.: 11/386,172

(22) Filed: Mar. 22, 2006

(65) Prior Publication Data

US 2007/0220967 A1 Sep. 27, 2007

(51) Int. Cl.
*A63B 53/00* (2006.01)
(52) U.S. Cl. .................. 73/170.02; 73/180; 73/708; 73/721
(58) Field of Classification Search .............. 73/170.02, 73/180, 708, 721
See application file for complete search history.

(56) References Cited

U.S. PATENT DOCUMENTS

| 4,152,938 | A |   | 5/1979  | Danninger      |         |
|-----------|---|---|---------|----------------|---------|
| 4,182,188 | A | * | 1/1980  | Britton et al. | 73/721  |
| 4,718,273 | A | * | 1/1988  | McCormack      | 73/180  |
| 5,025,661 | A |   | 6/1991  | McCormack      |         |
| 5,438,880 | A |   | 8/1995  | Washburn       |         |
| 6,076,963 | A |   | 6/2000  | Menzies et al. |         |
| 6,490,510 | B1|   | 12/2002 | Choisnet       |         |
| 6,557,423 | B1|   | 5/2003  | Vozhdaev et al.|         |
| 6,672,152 | B2|   | 1/2004  | Rouse et al.   |         |
| 6,721,682 | B1| * | 4/2004  | Moore et al.   | 702/182 |
| 6,817,240 | B2|   | 11/2004 | Collot et al.  |         |
| 7,070,144 | B1| * | 7/2006  | DiCocco et al. | 244/3.21|
| 7,226,015 | B1| * | 6/2007  | Prince et al.  | 244/3.21|
| 2005/0273292 | A1 |   | 12/2005 | Severson et al. |       |

OTHER PUBLICATIONS

Merriam-Webster.com. Definition of Cone. http://www.m-w.com/dictionary/cone. Dec. 14, 2007.*

* cited by examiner

*Primary Examiner*—Edward Lefkowitz
*Assistant Examiner*—Freddie Kirkland, III
(74) *Attorney, Agent, or Firm*—Black Lowe & Graham PLLC

(57) ABSTRACT

An air data system is described that includes a cone-shaped probe, a plurality of pressure transducers, and a processing device. The cone-shaped probe includes a first pressure port formed in a substantial tip of the probe and extending therethrough, and a plurality of pressure ports formed in a substantially evenly spaced circular pattern about a sloped surface of the probe and extending through the probe. The plurality of pressure transducers are each configured to receive at least one pressure transferred through at least one of the pressure ports and output one or more signals related to the pressures sensed. The processing device is configured to receive signals originating from the transducers. The processing device is further configured to calculate a static pressure, an angle of attack, and an angle of sideslip based on the received signals.

15 Claims, 5 Drawing Sheets

| Velocity | Altitude | Ps | Pt | Qc | Cone | α or β | a+α | a−α | rb = β | a+β | α−β | | Ps |
|---|---|---|---|---|---|---|---|---|---|---|---|---|---|
| | | | | | a | ra = α | | | | | | | |
| | | | | | 11 | 5 | 16 | 6 | 2 | 13 | 9 | | |
| | | | | Sin | 0.190809 | | 0.275637356 | 0.104528 | | 0.22495 | 0.15643447 | | |
| | | | | Tan | 0.1943803 | | | | | | | | |
| | | | | Cos | 0.9816272 | | | | | | | | |
| | | | | | PAOA1 | PAOA2 | PAOS1 | PAOS2 | | | | | |
| 1 | 100 | 10,000 | 20.57684947 | 21.05827175 | 0.4814223 | 20.709547 | 20.6271718 | 20.68514592 | 20.65216 | | | | |
| 2 | 500 | 10,000 | 20.57684947 | 34.35246857 | 13.775619 | 24.373925 | 22.0167938 | 23.67568951 | 22.73183 | | | | |
| 3 | 100 | 60,000 | 2.117784704 | 2.599207085 | 0.4814224 | 2.2504827 | 2.16810705 | 2.226081176 | 2.193096 | | | | |
| 4 | 500 | 60,000 | 2.117784704 | 15.89322355 | 13.775439 | 5.9148102 | 3.55771016 | 5.216584197 | 4.272738 | | | | |
| α and β Test | | | | | | | | | | | | | |
| | Truth α | Truth β | | | sin α | sin β | | a | b | | | | |
| 1 | 5 | 2 | | | 0.087155743 | 0.0348995 | | 5.00000 | 2.00000 | | | | |
| 2 | 5 | 2 | | | 0.087155743 | 0.0348995 | | 5.00000 | 2.00000 | | | | |
| 3 | 5 | 2 | | | 0.087155743 | 0.0348995 | | 5.00000 | 2.00000 | | | | |
| 4 | 5 | 2 | | | 0.087155743 | 0.0348995 | | 5.00000 | 2.00000 | | | | |
| Ps Test | | | | | | | | | | | Constants | | |
| | | Ps Truth | Pt | Qc | PAOA1 | PAOA2 | PAOS1 | PAOS2 | d0 | d1 | d2 | | Ps |
| 1 | 100 | 20.57684947 | 21.05827175 | 0.4814223 | 20.709547 | 20.6271718 | 20.68514592 | 20.65216 | 411.036 | −39.803 | 0.96359193 | | 20.576849 |
| 2 | 500 | 20.57684947 | 34.35246857 | 13.775619 | 24.373925 | 22.0167938 | 23.67568951 | 22.73183 | 495.112 | −43.889 | 0.96359193 | | 20.576849 |
| 3 | 100 | 2.117784704 | 2.599207085 | 0.4814224 | 2.2504827 | 2.16810705 | 2.226081176 | 2.193096 | 4.63508 | −4.2293 | 0.96359193 | | 2.1177847 |
| 4 | 500 | 2.117784704 | 15.89322355 | 13.775439 | 5.9148102 | 3.55771016 | 5.216584197 | 4.272738 | 13.2882 | −8.3152 | 0.96359193 | | 2.1177847 |

FIG. 7

METHODS AND SYSTEMS FOR DETERMINING AIR DATA PARAMETERS

BACKGROUND OF THE INVENTION

This invention relates generally to air data systems, and more specifically, to methods and systems for determining air data parameters such as one or more of static pressure, angle of attack, and angle of sideslip utilizing an air data system.

Missiles and other air vehicles, manned and unmanned, are presently being developed for operation at extended flight profiles which may include one or more of significantly reducing a time-to-target, traveling at high altitudes (i.e. 60,000 to 100,000 feet), and traveling at high speeds (i.e. Mach 3 and faster). All of these flight profiles utilize at least some air data parameters for flight control of the vehicle. Examples of air data parameters include, for example, an air speed in Mach (M), an altitude (Hp), a velocity (Vc), an angle of attack (AOA), and an angle of sideslip (AOS).

Various pitot probes, mechanical vanes, and other protrusive devices are known to be utilized in conjunction with conventional air data systems so that a static pressure, an angle of attack, and an angle of sideslip can be derived by the conventional air data system. However, when an air vehicle is traveling at the extended flight profiles described above, the air vehicles cannot utilize a conventional air data system. More specifically, to maintain the above described flight profiles, protrusions, pitot probes, and mechanical vanes extending from the body of the air vehicle need to be kept to a minimum because of the drag produced and the stresses that might be exerted on the air vehicle. However, to determine each of the air data parameters listed above, a value for static pressure, Ps, is still needed.

BRIEF SUMMARY OF THE INVENTION

In one aspect, an air data system is provided that comprises a cone-shaped probe, a plurality of pressure transducers, and a processing device. The cone-shaped probe comprises a first pressure port formed in a substantial tip of the probe and extending therethrough, and a plurality of pressure ports formed in a substantially evenly spaced circular pattern about a sloped surface of the probe and extending through the probe. The plurality of pressure transducers are each configured to receive at least one pressure transferred through at least one of the pressure ports and output one or more signals related to the pressures sensed. The processing device is configured to receive the signals originating from the transducers, and the processing device is further configured to calculate one or more of a static pressure, an angle of attack, and an angle of sideslip based on the received signals.

In another aspect, a method for determining air data parameters associated with an air vehicle is provided. The method comprises receiving, at a plurality of pressure transducers, a plurality of pressures transferred through a cone-shaped probe, the cone shaped probe having a first pressure port formed in a substantial tip of the probe and extending through to one pressure transducer, and a plurality of pressure ports formed in a substantially evenly spaced circular pattern about a sloped surface of the probe and extending through to additional pressure transducers. The method further comprises outputting, from the pressure transducers, signals relating to at least one of a total pressure, an angle of attack, and an angle of sideslip, and calculating, from the signals, at least one of a static pressure, Ps, an angle of attack ($\alpha$), and an angle of sideslip ($\beta$) and associated with the air vehicle.

In still another aspect, an apparatus for utilization in determining air data parameters for an air vehicle is provided. The apparatus has a longitudinal axis, a conical shape, a sloped surface, and a base end. The apparatus comprises a linear bore extending through the apparatus along the longitudinal axis, a first pair of bores substantially 180 degrees apart, originating at the sloped surface, and extending through the base end, and a second pair of bores substantially 180 degrees apart, each bore of the second pair of bores is substantially 90 degrees from the bores of the first pair of bores, originating at the sloped surface, and extending through the base end.

In yet another aspect, a processing device for an air data system is provided. The processing device is configured to receive one or more signals based on a total pressure, one or more signals based on pressures proportional to an angle of attack, and one or more signals based on pressures proportional to an angle of sideslip. The processing device is programmed to calculate at least one of a static pressure, an angle of attack, and an angle of sideslip, based on the received signals.

BRIEF DESCRIPTION OF THE DRAWINGS

FIG. 7 is a table illustrating test results utilizing the system of FIG. 6.

DETAILED DESCRIPTION OF THE INVENTION

Figure 1:
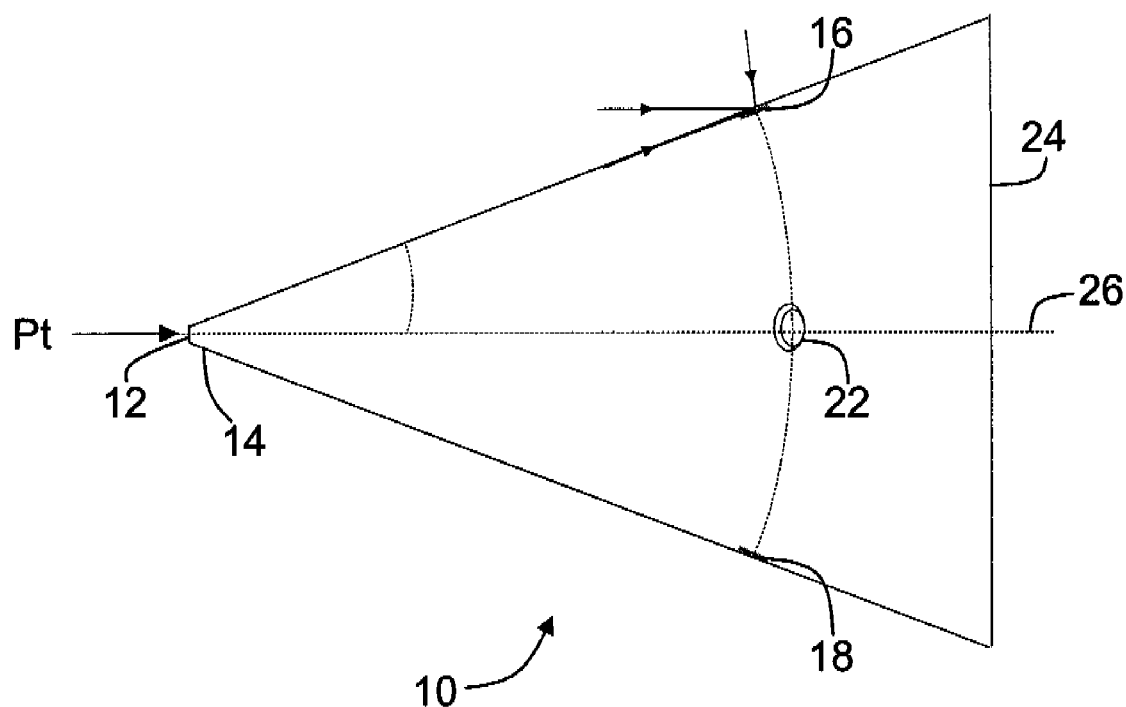
FIG. 1 is a side view of an air data probe.

A side view of a cone shaped air data probe 10 that includes five ports is illustrated in FIG. 1. The five ports, in one embodiment, operate as pressure ports. More specifically, a pressure port 12 at a tip 14 of probe 10 is configured as a total pressure port, Pt. Pressure ports 16 and 18 are configured as angle of attack pressure ports, and are located substantially 180 degrees apart from one another. Pressure ports 20 and 22 (shown in FIG. 2) are configured as angle of sideslip ports, and are located substantially 180 degrees apart from one another, and substantially 90 degrees from the respective angle of attack ports.

As further described below with respect to FIGS. 2 and 3, pressure ports 12, 16, 18, 20, and 22 extend through to a base end 24 of probe 10. Port 12 extends along a longitudinal axis 26 of probe 10.

This five port configuration, when communicatively coupled to sensors and a processing system as described below, provides a port system that utilizes a minimal number of ports in the derivation of air data parameters, including static pressure which allows utilization in air vehicles operating at the above described extended profiles. The processing system derives the air data parameters using an algorithmic approach as further described below.

Figure 2:
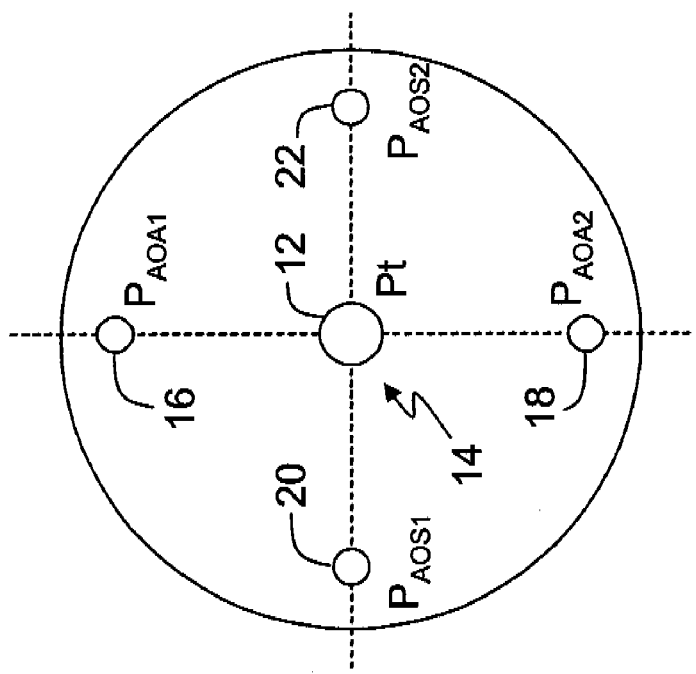
FIG. 2 is an end view of the air data probe of FIG. 1.

FIG. 2 is an end view of air data probe 10. FIG. 2 further illustrates that air data probe 10 has one pressure port 12 located at or substantially near tip 14 for total pressure (Pt). The other four ports 16, 18, 20, and 22 are located substantially 90 degrees apart. The difference in pressures at port 16 and at port 18 ($P_{AOA1}$ and $P_{AOA2}$) is proportional to an angle of attack (AOA or α) and the difference in pressures at port 20 and at port 22 ($P_{AOS1}$ and $P_{AOS2}$) is proportional to an angle of sideslip (AOS or β) for an air vehicle.

Figure 3:
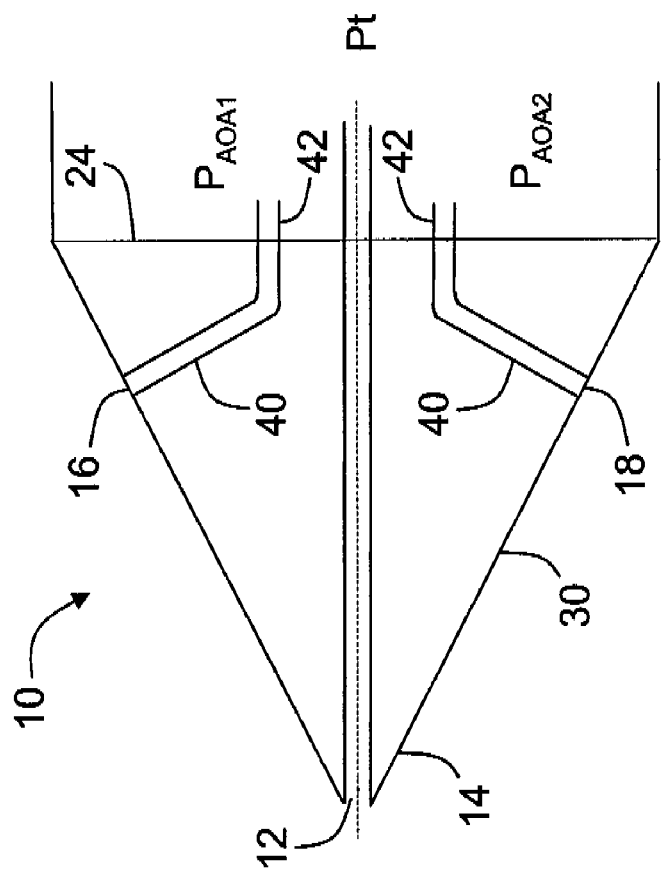
FIG. 3 is a cross-sectional view of the air data probe of FIG. 1.

FIG. 3 is a cross-sectional view of air probe 10 which further illustrates construction of ports 12, 16, and 18. Ports 20 and 22 (not shown in FIG. 3) are constructed to have a shape similar to that of ports 16 and 18. As seen in FIGS. 1, 2, and 3, ports 16, 18, 20, and 22 are essentially four evenly spaced pressure ports around one perimeter along the sloped surface of the cone associated with air data probe 10. Bores 16 and 18 are substantially 180 degrees apart, originating at a sloped surface 30 of probe 10 and extending through base end 24. Bores 20 and 22 are also substantially 180 degrees apart, with each bore 20 and 22 substantially 90 degrees from each of bores 16 and 18. Bores 20 and 22 also originate at sloped surface 30 and extend through base end 24.

Each bore 16, 18, 20, and 22 has a first length 40 that extends perpendicularly into probe 10 with respect to sloped surface 30 and a second length 42 that extends from base end 24, substantially parallel to linear bore 12 and connecting with first length 40.

Figure 5:
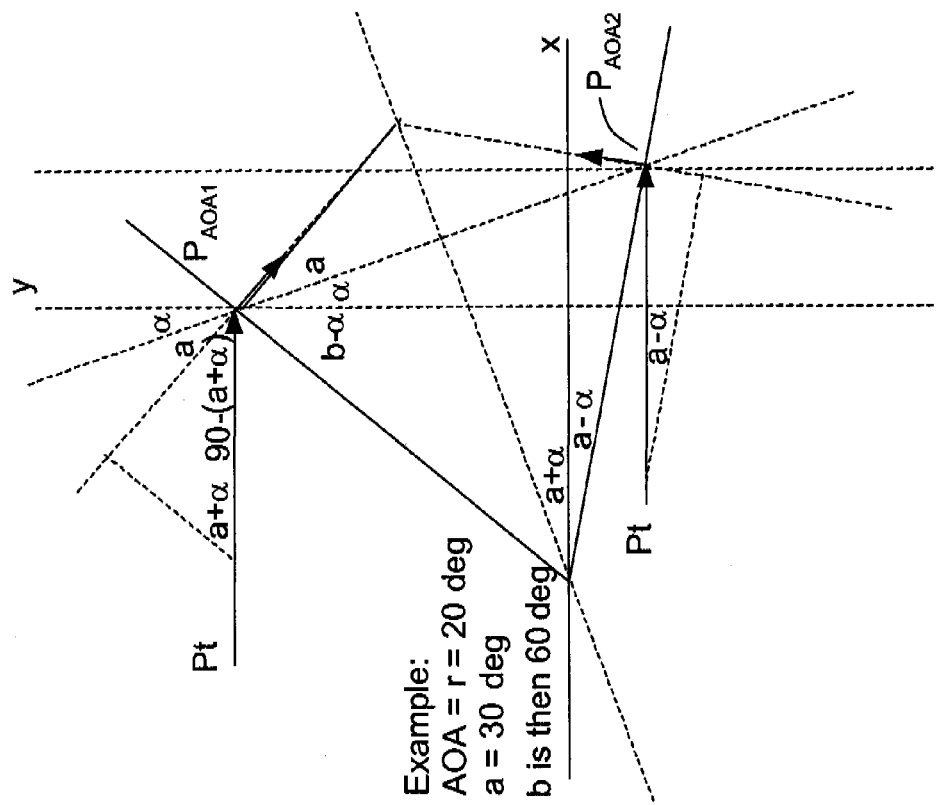
FIG. 5 is an illustration of the geometric relationship between the angle associated with the air data probe of Figure and a twenty degree angle of attack.
Figure 4:
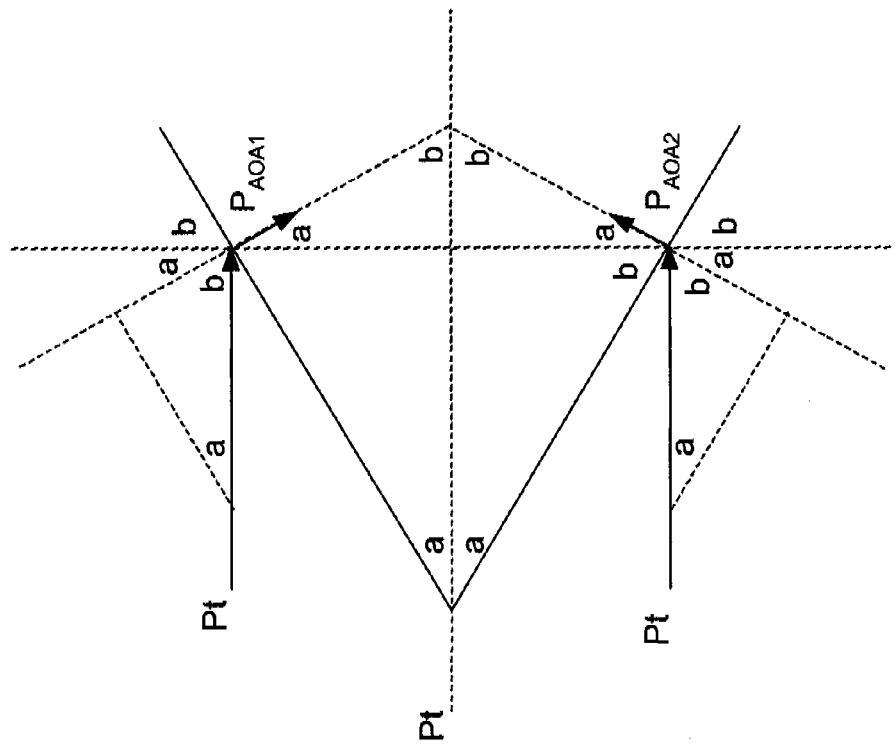
FIG. 4 is an illustration of the geometric relationship between the angle associated with the air data probe of FIG. 1 and a zero degree angle of attack.

FIGS. 4 and 5 illustrate a geometric relationship of the outer dimensions and associated angle (e.g., angle a) of the cone shape of air data probe 10 with respect to an angle of attack (i.e. angle α). FIG. 4 illustrates an angle of attack of zero degrees and FIG. 5 illustrates an angle of attack of twenty degrees. It should be noted that the geometric relationship of air data probe 10 with respect to the angle of sideslip is similar since air data probe 10 is symmetric around its body axis and the two ports for angle of sideslip (ports 20 and 22) are substantially 90 degrees from the angle of attack ports (ports 16 and 18).

In FIG. 4, the vehicle has no angle of attack or angle of sideslip. As a result, the pressure at port 12 is the total pressure, Pt, which equals a static pressure, Ps, plus an impact pressure Qc. Therefore, the impact pressure, Qc, can be expressed mathematically as Qc=Pt−Ps. The total pressure received at ports 16, 18, 20, and 22 are the static pressure, Ps, plus a resultant impact pressure, Qc, at each port. However, due to the conical shape of air data probe 10, the resultant impact pressures at each port 16, 18, 20, and 22 are a function of the angle of incidence due to the cone angle, referred to herein as "a". Therefore, for example, at port 16, the measured pressure, $P_{AOA1}$, is expressed mathematically as $P_{AOA1}$=Ps+Qc sin (a)=Ps+(Pt−Ps) sin (a).

FIG. 5 illustrates the geometry with an angle of attack of α (i.e. shown is α=20 degrees). The pressure sensed via port 16 is modified to account for the angle of attack α. This modified pressure is calculated according to $P_{AOA1}$=Ps+(Pt−Ps) sin (a+α). The following equations show the pressures that would be measured at each one of the side ports as a function of cone angle a, angle of attack α, and angle of sideslip β, and where $P_{AOA1}$ is the pressure at port 16, $P_{AOA2}$ is the pressure at port 18, $P_{AOS1}$ is the pressure at port 20, and $P_{AOS2}$ is the pressure at port 22.

$$P_{AOA1}=Ps+(Pt-Ps)\times\sin(a+\alpha)$$

$$P_{AOA2}=Ps+(Pt-Ps)\times\sin(a-\alpha)$$

$$P_{AOS1}=Ps+(Pt-Ps)\times\sin(a+\beta)$$

$$P_{AOS2}=Ps+(Pt-Ps)\times\sin(a-\beta)$$

The total pressure Pt and cone side port pressures $P_{AOA1}$, $P_{AOA2}$, $P_{AOS1}$, and $P_{AOS2}$ are measured during flight. The cone angle a is known based on the design and fabrication associated with air data probe 10. Therefore, as indicated in the above equations, if static pressure, Ps, can be determined, then angle of attack (α) and angle of sideslip (β) can be determined.

The static pressure Ps can be derived from the measured pressures Pt, $P_{AOA1}$, $P_{AOA2}$, $P_{AOS1}$, and $P_{AOS2}$ and the cone angle a. Since, sin (a±α)=cos (α)*sin (a)±cos (a)*sin (α), and sin (a±β)=cos (β)*sin (a)±cos (a)*sin (β), taking sum and difference of the $P_{AOA1}$ and $P_{AOA2}$ equations results in:

$$(P_{AOA1}+P_{AOA2})/2=Ps+(Pt-Ps)*\sin(a)*\cos(\alpha), \text{ and}$$

$$(P_{AOA1}-P_{AOA2})/2=(Pt-Ps)*\cos(a)*\sin(\alpha).$$

Also, since $\sin^2(\alpha)+\cos^2(\alpha)=1$, the above two equations result in a quadratic equation in terms of static pressure, Ps:

$$\left(\frac{(P_{AOA1}+P_{AOA2})/2-Ps}{\sin(a)}\right)^2+\left(\frac{(P_{AOA1}-P_{AOA2})/2}{\cos(a)}\right)^2=(Pt-Ps)^2$$

Grouping like powers of Ps results in d2×Ps×Ps+d1×Ps+d0=0, where d2=1−$\sin^2$(a)=$\cos^2$(a), d1=2×Pt×$\sin^2$(a)−($P_{AOA1}+P_{AOA2}$), and $$d0=\left(\frac{(P_{AOA1}+P_{AOA2})}{2}\right)^2+\tan^2(a)\left(\frac{(P_{AOA1}-P_{AOA2})}{2}\right)^2-\sin^2(a)\times Pt^2.$$

Since −d1/(2×d2)>Ps in the typical situation where sin (a)<cos (α), the smallest of two roots of this quadratic equation is used. Ps is then calculated according to:

$$Ps=\frac{-d1-\sqrt{(d1\times d1-4\times d0\times d2)}}{2\times d2}.$$

By using this value for Ps, equations for sin (α) and sin (β) result which are used to determine angle of attack, α, and angle of sideslip, β, according to:

$$\sin(\alpha)=\frac{P_{AOA1}-P_{AOA2}}{(Pt-Ps)\times 2\times\cos(a)} \text{ or } \alpha=\sin^{-1}\left[\frac{P_{AOA1}-P_{AOA2}}{(Pt-Ps)\times 2\times\cos(a)}\right], \text{ and}$$

$$\sin(\beta)=\frac{P_{AOS1}-P_{AOS2}}{(Pt-Ps)\times 2\times\cos(a)} \text{ or } \beta=\sin^{-1}\left[\frac{P_{AOS1}-P_{AOS2}}{(Pt-Ps)\times 2\times\cos(a)}\right].$$

Figure 6:
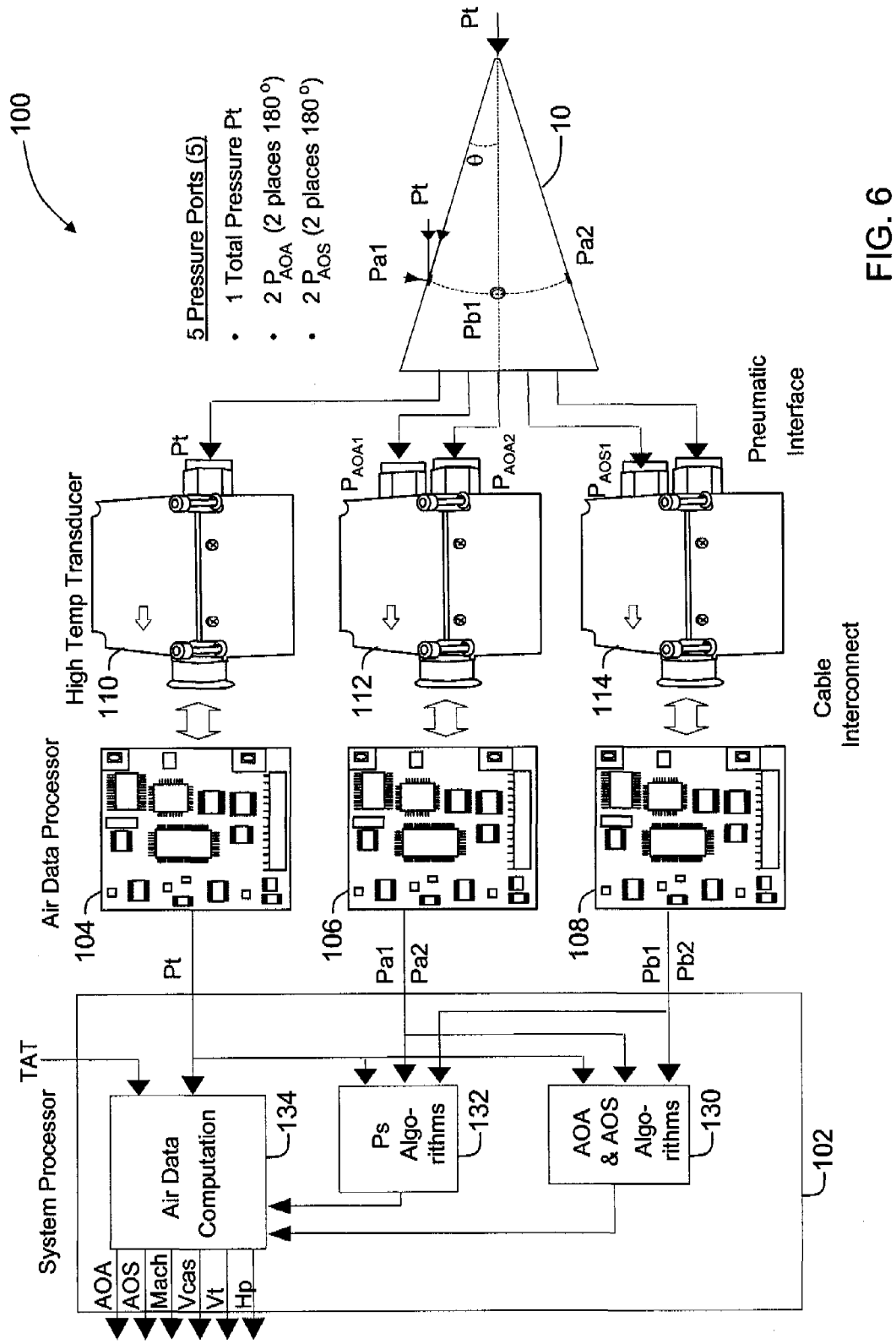
FIG. 6 is a block diagram of an air data system incorporating the air data probe of FIG. 1.

FIG. 6 is a block diagram of an air data system 100 that incorporates air data probe 10. Air data system 100 also includes a system processor 102, air data processing circuits 104, 106, and 108, transducers 110, 112, and 114. As illustrated, processing circuit 104 processes data received from transducer 110, processing circuit 106 processes data received from transducer 112, and processing circuit 108 processes data received from transducer 114. Transducer 110 receives pneumatic pressure from total pressure port 12 (shown in FIG. 2) and converts the pressure into electrical signals for processing by processing circuit 104. Transducer 112 receives pneumatic pressure from angle of attack pressure ports 16 and 18 (shown in FIG. 2) and converts the pressure into electrical signals for processing by processing circuit 106. Transducer 114 receives pneumatic pressure from angle of sideslip pressure ports 20 and 22 (shown in FIG. 2) and converts the pressure into electrical signals for processing by processing circuit 108.

Now referring specifically to system processor 102, in the embodiment illustrated, it is configured to receive data relating to total pressure, the pressures related to the two angle of attack ports, and the pressures related to the two angle of sideslip ports. System processor is configured with an AOA and AOS algorithm 130, and a static pressure (Ps) algorithm 132. An air data computation algorithm 134 receives an output from the AOA and AOS algorithm 130 and the static pressure Ps algorithm 132 to calculate angle of attack (AOA or α), angle of sideslip (AOS or β), a mach number (M), a calibrated airspeed (Vcas), a total velocity (Vt), and a pressure altitude (Hp).

Having determined a static pressure, air data parameters, specifically, pressure altitude, mach number, and calibrated air speed can be determined as described below.

For pressure altitude, Hp, there are three equations which are dependent on the altitude band:

$$Hp = \frac{1 - \left(\frac{Ps}{Po}\right)^{0.190255}}{6.875586 \times 10^{-6}} \text{ for } Hp \leq 36 \text{ Kft}; Po = 29.92126 \text{ in}Hg$$

$$Hp = -2080585 \times \ln\left(\frac{Ps}{6.68322}\right) + 3608923; \text{ for } 36 \text{ Kft} < Hp > 65.6 \text{ Kft}$$

$$Hp = 656167979 + 7107939632\left[\left(\frac{Ps}{1.61673394}\right)^{-.0292712672} - 1\right];$$

for 6561679 ft < Hp < 10498687 ft

The mach number (M) is calculated according to:

$$M = 2.236068\left[\left(\frac{Pt}{Ps}\right)^{0.2857142} - 1\right]^{0.5} \text{ or}$$

$$M = 2.236068\left[\left(\frac{Qc}{Ps} + 1\right)^{0.2857142} - 1\right]^{0.5} \text{ for } M \leq 1.0, \text{ and}$$

$$\frac{Pt}{Ps} = \frac{KM^7}{(7M^2 - 1)^{2.5}} \text{ for } M > 1.0.$$

For calibrated Airspeed $$Vc = a_o\left[5\left\{\left(\frac{Pt - Ps}{Po} + 1\right)^{\frac{2}{7}} - 1\right\}\right]^{0.5},$$

for Vcas<$a_o$=661.4786 knots and $$Pt - Ps = 29.92125984251969\left[\frac{166.92158009\left(\frac{Vc}{ao}\right)^7}{\left(7\left(\frac{Vc}{ao}\right)^2 - 1\right)^{2.5}} - 1\right],$$

for Vc > 661.4785993285615 knots.

As will be appreciated, certain of the above equations are solved utilizing algorithms within air data computation algorithm 134. In specific embodiments, an approximation and look-up table or a polynomial curve fit are utilized to solve the equations.

Using the above described systems and methods, a test case has been conducted to validate algorithms within system processor 102. The results of the test case are tabulated in FIG. 7. As can be seen, there is an excellent correlation when the results of the above described calculations are compared to known data.

While the invention has been described in terms of various specific embodiments, those skilled in the art will recognize that the invention can be practiced with modification within the spirit and scope of the claims.

The invention claimed is:

1. An air data system comprising:
   a cone-shaped probe comprising a first pressure port formed in a substantial tip of said probe and extending therethrough, and a plurality of pressure ports formed in a substantially evenly spaced circular pattern about a sloped surface of said probe and extending through said probe;
   a plurality of pressure transducers each configured to receive at least one pressure transferred through at least one of said pressure ports and output one or more signals related to the pressures sensed; and
   a processing device configured to receive the signals originating from said transducers, said processing device further configured to calculate one or more of a static pressure, an angle of attack, and an angle of sideslip, based on the received signals.

2. An air data system according to claim 1 wherein said plurality of pressure ports comprises four pressure ports substantially 90 degrees apart.

3. An air data system comprising:
   a probe comprisine a first pressure port formed in a tip portion of said probe and extendine therethroneh, and a plurality of pressure ports formed in a substantially evenly spaced circular pattern about a sloped surface of said probe and extendine through said probe;
   a plurality of pressure transducers each fluidly coupled to at least one of said pressure ports and each transducer operable to output one or more signals related to a sensed pressure; and
   a processing device operable to receive the transducer signals, said processing device further configured to calculate one or more of a static pressure, an angle of attack, and an angle of sideslip, based on the received signals,
   wherein said plurality of pressure ports comprises four pressure ports substantially 90 degrees apart and wherein a pressure at said first pressure port is proportional to a total pressure, Pt, a pressure difference between two of said pressure ports substantially 180 degrees apart ($P_{AOA1}$–PAOA$_2$) is proportional to an angle of attack, and the pressure difference between the other two pressure ports substantially 180 degrees apart ($P_{AOS1}$–PAOS$_2$) is proportional to an angle of sideslip.

4. An air data system comprising:
   a probe comprising a first pressure port formed in a tip portion of said probe and extending therethrough, and a plurality of pressure ports formed in a substantially evenly spaced circular pattern about a sloped surface of said probe and extending through said probe;
   a plurality of pressure transducers each configured to receive at least one pressure transferred through at least one of said pressure ports and output one or more sianals related to the pressures sensed; and
   a processing device configured to receive the signals originating from said transducers, said processing device further configured to calculate one or more of a static pressure, an angle of attack, and an angle of sideslip, based on the received signals, wherein static pressure is calculated according to:

$$Ps = \frac{-d1 - \sqrt{(d1 \times d1 - 4 \times d0 \times d2)}}{2 \times d2}, \text{ where:}$$

$$d2 = 1 - \sin^2(a) = \cos^2(a), d1 = 2 \times Pt \times \sin^2(a) - (P_{AOA1} + P_{AOA2}), \text{ and}$$

$$d0 = \left(\frac{(P_{AOA1} + P_{AOA2})}{2}\right)^2 + \tan^2(a) \times \left(\frac{(P_{AOA1} - P_{AOA2})}{2}\right)^2 - \sin^2(a) \times Pt^2,$$

a is an angle associated with the probe, Pt is a pressure measurement at said first pressure port, $P_{AOA1}$ and $P_{AOA2}$ are pressure measurements at two of said pressure ports substantially 180 degrees apart and proportional to an angle of attack, and $P_{AOS1}$ and $P_{AOS2}$ are pressure measurements at two of said pressure ports substantially 180 degrees apart and proportional to an angle of sideslip.

5. An air data system according to claim 4 where the angle of attack, α, and angle of side slide, β, are calculated according to:

$$\sin(\alpha) = \frac{P_{AOA1} - P_{AOA2}}{(Pt - Ps) \times 2 \times \cos(a)} \text{ or } \alpha = \sin^{-1}\left[\frac{P_{AOA1} - P_{AOA2}}{(Pt - Ps) \times 2 \times \cos(a)}\right], \text{ and}$$

$$\sin(\beta) = \frac{P_{AOS1} - P_{AOS2}}{(Pt - Ps) \times 2 \times \cos(a)} \text{ or } \beta = \sin^{-1}\left[\frac{P_{AOS1} - P_{AOS2}}{(Pt - Ps) \times 2 \times \cos(a)}\right],$$

where $P_{AOA1} = Ps + (Pt - Ps) \times \sin(a + \alpha),$ $P_{AOA2} = Ps + (Pt - Ps) \times \sin(a - \alpha),$ $P_{AOS1} = Ps + (Pt - Ps) \times \sin(a + \beta),$ $P_{AOS2} = Ps + (Pt - Ps) \times \sin(a - \beta).$

6. A method for determining air data parameters associated with an air vehicle, said method comprising:
receiving, at a plurality of pressure transducers, a plurality of pressures transferred through a cone-shaped probe, the cone-shaped probe having a first pressure port formed in a substantial tip of the probe and extending through to one pressure transducer, and a plurality of pressure ports formed in a substantially evenly spaced circular pattern about a sloped surface of the probe and extending through to additional pressure transducers;
outputting, from the pressure transducers, signals relating to at least one of a total pressure, an angle of attack, and an angle of sideslip; and
calculating, from the signals, at least one of a static pressure (Ps), an angle of attack (α), an angle of sideslip (β) associated with the air vehicle,
and wherein receiving a plurality of pressures comprises:
receiving a pressure at the first pressure port that is proportional to a total pressure, Pt, at the air vehicle;
receiving, at two pressure ports substantially 180 degrees apart, pressures that are proportional to an angle of attack; and
receiving, at the other two pressure ports that are substantially 180 degrees apart, pressures that are proportional to an angle of sideslip.

7. A method according to claim 6 wherein the plurality of pressure ports includes four pressure ports substantially 90 degrees apart.

8. A method according to claim 6 wherein calculating, from the signals, a static pressure, Ps, associated with the air vehicle comprises calculating static pressure according to:

$$Ps = \frac{-d1 - \sqrt{(d1 \times d1 - 4 \times d0 \times d2)}}{2 \times d2}, \text{ where:}$$

$$d2 = 1 - \sin^2(a) = \cos^2(a),$$

$$d1 = 2 \times Pt \times \sin^2(a) - (P_{AOA1} + P_{AOA2}),$$

and $$d0 = \left(\frac{(P_{AOA1} + P_{AOA2})}{2}\right)^2 + \tan^2(a) \times \left(\frac{(P_{AOA1} - P_{AOA2})}{2}\right)^2 - \sin^2(a) \times Pt^2,$$

where a is an angle associated with said cone shaped probe, $P_{AOA1}$ and $P_{AOA2}$ are pressure measurements at the pressure ports that are proportional to an angle of attack, and $P_{AOS1}$ and $P_{AOS2}$ are pressure measurements at the pressure ports that are proportional to an angle of sideslip.

9. A method according to claim 8 wherein calculating, from the signals, an angle of attack (α) and an angle of sideslip (β) associated with the air vehicle comprises calculating the angle of attack, (α) and angle of sideslip (β), according to:

$$\sin(\alpha) = \frac{(P_{AOA1} - P_{AOA2})}{(Pt - Ps) \times 2 \times \cos(a)} \text{ or}$$

$$\alpha = \sin^{-1}\left[\frac{P_{AOA1} - P_{AOA2}}{(Pt - Ps) \times 2 \times \cos(a)}\right],$$

and $\sin(\beta) = \frac{(P_{AOS1} - P_{AOS2})}{(Pt - Ps) \times 2 \times \cos(a)}$ or $$\beta = \sin^{-1}\left[\frac{P_{AOS1} - P_{AOS2}}{(Pt - Ps) \times 2 \times \cos(a)}\right].$$

10. A method according to claim 6 wherein the pressures that are proportional to an angle of attack, $P_{AOA1}$ and $P_{AOA2}$, and the pressures that are proportional to an angle of sideslip, $P_{AOS1}$, and $P_{AOS2}$ are related to Ps, Pt, a, α, and β according to:

$P_{AOA1} = Ps + (Pt-Ps) \times \sin(a+\alpha),$ $P_{AOA2} = Ps + (Pt-Ps) \times \sin(a-\alpha), P_{AOS1} = Ps + (Pt-Ps) \times \sin(a+\beta)$ $P_{AOS2} = Ps + (Pt-Ps) \times \sin(a-\beta).$

11. A processing device for an air data system, said processing device configured to receive one or more signals based on a total pressure, one or more signals based on pressures proportional to an angle of attack, and one or more signals based on pressures proportional to an angle of sideslip, said processing device programmed to calculate at least one of a static pressure, an angle of attack, and angle of sideslip, based on the received signals, and wherein static pressure is calculated according to:

$$Ps = \frac{-d1 - \sqrt{(d1 \times d1 - 4 \times d0 \times d2)}}{2 \times d2}, \text{ where:}$$

$$d2 = 1 - \sin^2(a) = \cos^2(a),$$

$$d1 = 2 \times Pt \times \sin^2(a) - (P_{AOA1} + P_{AOA2}),$$

and $$d0 = \left(\frac{(P_{AOA1} + P_{AOA2})}{2}\right)^2 + \tan^2(a) \times \left(\frac{(P_{AOA1} + P_{AOA2})}{2}\right)^2 - \sin^2(a) \times Pt^2$$

-continued where a is an angle associated with said cone shaped probe, $P_{AOA1}$ and $P_{AOA2}$ are pressure measurements at the pressure ports that are proportional to an angle of attack, and $P_{AOS1}$ and $P_{AOS2}$ are pressure measurements at the pressure ports that are proportional to an angle of sideslip.

12. A processing device according to claim 11 wherein said processing device is configured to calculate an angle of attack, ($\alpha$) and angle of sideslip ($\beta$) according to:

$$\sin(\alpha) = \frac{P_{AOA1} + P_{AOA2}}{(Pt - Ps) \times 2 \times \cos(a)} \text{ or}$$

$$\alpha = \sin^{-1}\left[\frac{P_{AOA1} + P_{AOA2}}{(Pt - Ps) \times 2 \times \cos(a)}\right], \text{ and}$$

$$\sin(\beta) = \frac{P_{AOS1} + P_{AOS2}}{(Pt - Ps) \times 2 \times \cos(a)} \text{ or}$$

$$\beta = \sin^{-1}\left[\frac{P_{AOS1} + P_{AOS2}}{(Pt - Ps) \times 2 \times \cos(a)}\right], \text{ where } Pt$$

is representative of a total pressure, and $P_{AOA1}$, $P_{AOA2}$, $P_{AOS1}$, and $P_{AOS2}$ are representative of pressures associated with an angle of attack and an angle of sideslip, and related to Ps, Pt, a, $\alpha$, and $\beta$ according to:

$P_{AOA1} = Ps + (Pt - Ps) \times \sin(a + \alpha)$ $P_{AOA2} = Ps + (Pt - Ps) \times \sin(a - \alpha)$ $P_{AOS1} = Ps + (Pt - Ps) \times \sin(a + \beta)$ $P_{AOS2} = Ps + (Pt - Ps) \times \sin(a - \beta)$.

13. A processing device according to claim 12 wherein pressure altitude, Hp, is calculated according to:

$$Hp = \frac{1 - \left(\frac{Ps}{Po}\right)^{0.190255}}{6.875586 \times 10 \times^{-6}} \text{ for } Hp \leq 36 \text{ Kft};$$

-continued $Po = 29.92126$ in $Hg$ $$Hp = -20805.85 \times \ln\left(\frac{Ps}{6.68322}\right) + 36089.23;$$

for 36 Kft $< Hp > 65.6$ Kft $$Hp = 65616.7979 + 710793.9632 \left[\left(\frac{Ps}{1.61673394}\right)^{-.0292712672} - 1\right];$$

for 6516.79 ft $< Hp < 104986.87$ ft.

14. A processing device according to claim 12 wherein mach number, M, is calculated according to:

$$M = 2.236068 \left[\left(\frac{Pt}{Ps}\right)^{0.2857142} - 1\right]^{0.5} \text{ or}$$

$$M = 2.236068 \left[\left(\frac{Qc}{Ps} + 1\right)^{0.2857142} - 1\right]^{0.5} \text{ for } M \leq 1.0, \text{ and}$$

$$\frac{Pt}{Ps} = \frac{KM^7}{(7M^2 - 1)^{2.5}} \text{ for } M > 1.0.$$

15. A processing device according to claim 12 wherein calibrated airspeed, Vcn is calculated according to $$Vcas = a_0 \left[5\left\{\left(\frac{Pt - Ps}{Po} + 1\right)^{\frac{2}{7}} - 1\right\}\right]^{0.5},$$

for Vcas$<a_o=661.4786$ knots and $$Pt - Ps = 29.92125984251969 \left[\frac{166.92158009 \left(\frac{Vc}{ao}\right)^7}{\left(7\left(\frac{Vc}{ao}\right)^2 - 1\right)^{2.5}} - 1\right],$$

for Vcas $> 661.4785993285615$ knots.

\* \* \* \* \*

UNITED STATES PATENT AND TRADEMARK OFFICE
CERTIFICATE OF CORRECTION

PATENT NO. : 7,389,686 B2  
APPLICATION NO. : 11/386172  
DATED : June 24, 2008  
INVENTOR(S) : Thomas et al.

It is certified that error appears in the above-identified patent and that said Letters Patent is hereby corrected as shown below:

In column 6, Claim 3, line 31 the word "comprisine" should be "comprising"

In column 6, Claim 3, line 32 the word "extendine" should be "extending"

In column 6, Claim 3, line 32 the word "therethroneh" should be "therethrough"

In column 6, Claim 3, line 34 the word "extendine" should be "extending"

In column 6, Claim 3, line 48 the equation "$P_{AOA1} - PAOA_2$" should be "$P_{AOA1} - P_{AOA2}$"

In column 6, Claim 3, line 51 the equation "$P_{AOS1} - PAOS_2$" should be "$P_{AOS1} - P_{AOS2}$"

In column 6, Claim 4, line 61 the word "sianals" should be "signals"

In column 7, Claim 6, line 50 the word "sidesslip" should be "sideslip"

In column 10, Claim 13, line 10 the line "for 6516.79 ft < $Hp$ < 104986.87 ft." should be "for 65616.79 ft < $Hp$ < 104986.87 ft."

In column 10, Claim 15, line 26 the word "Von" should be Vcas"

UNITED STATES PATENT AND TRADEMARK OFFICE
CERTIFICATE OF CORRECTION

PATENT NO. : 7,389,686 B2
APPLICATION NO. : 11/386172
DATED : June 24, 2008
INVENTOR(S) : Thomas et al.

It is certified that error appears in the above-identified patent and that said Letters Patent is hereby corrected as shown below:

In column 10, Claim 15, line 34 the equation "for Vcasc< $a_o$ =661.4786 knots and" should be "for Vcas< $a_o$ =661.4786 knots and"

Signed and Sealed this

Third Day of March, 2009

JOHN DOLL
*Acting Director of the United States Patent and Trademark Office*